(12) United States Patent
Reddehase et al.

(10) Patent No.: US 10,875,373 B2
(45) Date of Patent: Dec. 29, 2020

(54) AXIAL BALL JOINT AND LENGTH-ADJUSTABLE TWO-POINT LINK WITH SUCH AN AXIAL BALL JOINT

(71) Applicant: ZF FRIEDRICHSHAFEN AG, Friedrichshafen (DE)

(72) Inventors: Günter Reddehase, Brockum (DE); Janina Altmeppen, Meppen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 313 days.

(21) Appl. No.: 16/094,861

(22) PCT Filed: Mar. 23, 2017

(86) PCT No.: PCT/EP2017/056975
§ 371 (c)(1),
(2) Date: Oct. 18, 2018

(87) PCT Pub. No.: WO2017/182228
PCT Pub. Date: Oct. 26, 2017

(65) Prior Publication Data
US 2019/0118596 A1    Apr. 25, 2019

(30) Foreign Application Priority Data
Apr. 22, 2016   (DE) .................. 10 2016 206 863

(51) Int. Cl.
*F16C 11/06* (2006.01)
*B62D 7/20* (2006.01)
(Continued)

(52) U.S. Cl.
CPC ............. *B60G 7/005* (2013.01); *B60G 7/003* (2013.01); *B62D 7/16* (2013.01); *B62D 7/20* (2013.01);
(Continued)

(58) Field of Classification Search
CPC ...... B60G 2204/416; B60G 2206/1112; B60G 2206/111; B60G 7/005; B62D 7/20; F16C 11/0633; F16C 11/0623
See application file for complete search history.

(56) References Cited

U.S. PATENT DOCUMENTS 4,076,344 A * 2/1978 Gaines ............... F16C 11/0638
384/213
5,551,791 A * 9/1996 Schneider ............... B62D 7/16
403/144
(Continued)

FOREIGN PATENT DOCUMENTS

CN     109229205 A  *  1/2019
DE        970 802       10/1958
(Continued)

*Primary Examiner* — Jacob S. Scott
*Assistant Examiner* — Mary E Young
(74) *Attorney, Agent, or Firm* — Cozen O'Connor

(57) ABSTRACT

An axial ball joint for a length-adjustable two-point link having a housing and a ball stud supported in the housing by a joint ball to be rotatably and swivelably movable and which extends in an axial direction out of the housing in undeflected state. The housing has a connection pin integrally connected to the housing that extends perpendicular to axial direction. A length-adjustable two-point link has two angle joints connected to one another via a connection element, particularly a connection pipe. One angle joint is formed as an axial ball joint connected to the connection element to be adjustable in length. The other angle joint is formed as a radial ball joint and is rigidly connected to the connection element.

19 Claims, 4 Drawing Sheets

(51) Int. Cl.
*B60G 7/00* (2006.01)
*B62D 7/16* (2006.01)

(52) U.S. Cl.
CPC ...... *F16C 11/0623* (2013.01); *F16C 11/0633* (2013.01); *F16C 11/0642* (2013.01); *F16C 11/0695* (2013.01); *B60G 2204/416* (2013.01); *B60G 2206/11* (2013.01); *B60G 2206/1112* (2013.01)

(56) References Cited

U.S. PATENT DOCUMENTS

| | | | | |
|---|---|---|---|---|
| 5,603,583 | A | * | 2/1997 | Jackson ................ B60G 7/005 280/93.51 |
| 5,954,353 | A | * | 9/1999 | Kincaid ................ B60G 7/005 280/124.106 |
| 6,030,141 | A | * | 2/2000 | Lieber ................ F16C 11/0642 29/441.1 |
| 9,476,447 | B2 | * | 10/2016 | Schmidt .............. F16C 11/0685 |
| 2003/0074778 | A1 | * | 4/2003 | Takeuchi ................ B62D 7/20 29/456 |
| 2014/0086667 | A1 | | 3/2014 | Elterman et al. |

FOREIGN PATENT DOCUMENTS

| | | | | |
|---|---|---|---|---|
| DE | 103 48 645 | | 6/2005 | |
| DE | 10 2014 202628 | | 8/2015 | |
| FR | 2 693 955 | | 1/1994 | |
| FR | 2693955 | A1 * | 1/1994 | ............. B60G 7/005 |
| GB | 753 234 | | 7/1956 | |
| GB | 2265940 | A * | 10/1993 | .......... F16C 11/0638 |

\* cited by examiner

AXIAL BALL JOINT AND LENGTH-ADJUSTABLE TWO-POINT LINK WITH SUCH AN AXIAL BALL JOINT

CROSS REFERENCE TO RELATED APPLICATIONS

This is a U.S. national stage of application No. PCT/EP2017/056975, filed on Mar. 23, 2017. Priority is claimed on German Application No. DE102016206863.6, filed Apr. 22, 2016, the content of which is incorporated here by reference.

BACKGROUND OF THE INVENTION

1. Field of the Invention

The invention is directed to an axial ball joint and to a two-point link that is adjustable in length and has an axial ball joint of this kind.

2. Description of the Prior Art

Axial ball joints and length-adjustable two-point links with axial ball joints of the type mentioned above are known from the prior art. DE 103 48 645 A1 describes a length-adjustable two-point link provided with an axial ball joint at one end. The axial ball joint has a housing and a ball stud supported in the housing with a joint ball so as to be rotatably and swivelably movable and which extends out of the housing in an axial direction in undeflected state. The ball stud is screwed by an external thread into a corresponding internal thread of a connection pipe of the two-point link. To adjust the length of the two-point link, the ball stud further has wrench faces for applying an open-end wrench. When the ball stud is turned, the connection pipe and the housing of the axial ball joint move away from one another or the two component parts move toward one another depending on the rotating direction. The housing of the axial ball joint has a threaded journal having an external thread that extends in axial direction. The threaded stud is arranged opposite the side on which the ball stud extends out of the housing. The threaded journal serves to connect the axial ball joint to a longitudinal support extending perpendicular to axial direction. For this purpose, the threaded journal is guided through a receiving hole extending in axial direction in the longitudinal support and is fixed in position by a threaded nut.

SUMMARY OF THE INVENTION

An object of one aspect of the invention to provide an axial ball joint with an alternative possibility for connecting.

Accordingly, one aspect of the invention provides an axial ball joint, in particular for a length-adjustable two-point link. The axial ball joint has a housing and a ball stud supported in the housing by a joint ball so as to be rotatably and swivelably movable and which extends in an axial direction out of the housing in undeflected state. According to one aspect of the invention, the housing has a connection pin integrally connected to the housing and which extends at least substantially perpendicular to axial direction.

The invention provides an axial ball joint formed as an angle joint. In the context of the present invention, "angle joint" means a ball joint which provides a first pin-like connection possibility for a first component part and a second pin-like connection possibility at least substantially perpendicular to the latter for a second component part. Due to the fact that the ball stud is, inter alia, rotatably movably supported in the housing, it can be connected, for example, via a thread connection, to a connection component part, for example, a two-point link, such that its length can be varied. In particular, the connection can be a direct connection without interposed elements such as a threaded sleeve, for example. This minimizes the extent of component parts, i.e., the quantity of component parts to be assembled, and therefore also minimizes the assembly effort and at the same time provides a connection which offers advantages in terms of weight. The connection pin can also be slightly angled and for this reason does not extend exactly perpendicular to axial direction. The axial ball joint also makes it possible to adjust the length of a two-point link that is already installed in the vehicle.

With regard to ball joints, there is a distinction between axial ball joints and radial ball joints. This distinction is determined by the respective principal loading direction of the forces acting on the ball studs of the two types of ball joint in the installed state. The position of the undeflected ball joint serves as a reference for defining the two types of ball joint, where the ball stud is considered undeflected when it can be swiveled by the same angular deflection in all possible directions proceeding from the undeflected position. Therefore, the undeflected position is also referred to as zero position or neutral angular position. The principal loading direction of an axial ball joint lies in direction of the longitudinal central axis of the ball stud, while in the case of a radial ball joint the principal loading direction extends perpendicular to the longitudinal central axis of the ball stud. Therefore, the two types of ball joint differ from one another basically with respect to the loads acting upon them and accordingly also with respect to construction. Accordingly, a chief requirement for axial ball joints consists in supporting a joint ball of the ball stud in a housing of the axial ball joint such that the ball stud cannot be disengaged from the housing under a tensile load. This so-called pull-out force of the axial ball joint is a key quality criterion for an axial ball joint. In radial ball joints, the ball stud is loaded by forces acting on the ball stud radial to its longitudinal central axis. Consequently, the pull-out force of the ball stud in radial ball joints is less than that in axial ball joints, which is reflected in the construction of the housing.

The connection pin preferably has a conical portion. The conical portion serves for the connection of the connection pin to a connection component part of the axial ball joint such as, for example, a wheel carrier, also called a knuckle, a steering arm, or a pitman arm. The connection component part has a cone receptacle corresponding to the conical portion. As a result of this conical fit, a self-centering, snug fit of the connection pin in the cone receptacle of the connection component part is achieved regardless of tolerances. Alternatively, the connection pin can also have a cylindrical portion which is connected to the cone receptacle of the connection component part by a conical disk.

In an advantageous further development, the connection pin has a fastening thread at its free end and a driving geometry at the front side formed as inner contour, particularly an internal hexagonal geometry or internal hexalobular geometry. In order to ensure a durable conical fit and to prevent loosening of the conical connection, the conical portion of the connection pin can be clamped relative to the cone receptacle of the connection component part via a nut received by the fastening thread. The driving geometry can be formed, for example, as an internal hexagonal geometry or as an internal hexalobular geometry, also known as Torx drive. In conjunction with a suitable tool, for example, a hexagon socket wrench, the driving geometry can prevent the connection pin from rotating along while the nut is being tightened. This prevents damage to the surfaces contacting the area of the conical fit.

It is further preferable that a plastic bearing shell, which snugly encircles less than half of the joint ball, is arranged in the housing. The plastic bearing shell is formed in particular so as to be rotationally symmetrical with an axis of rotation extending in axial direction. At least in the area of a mutual contact zone with the joint ball, the plastic bearing shell is solidly constructed, i.e., so as to be free of voids, slots or other discontinuities in the volume of the component part. When it is stated that the plastic bearing shell snugly encircles less than half of the joint ball, this means that the plastic bearing shell does not extend beyond the equator of the joint ball. By "equator" is meant the circumferential line of a circular area having the diameter of the joint ball and simultaneously extending perpendicular to axial direction when the ball stud is not deflected. The plastic bearing shell is sufficient to support compressive forces which act in axial direction and which can act on the axial ball joint. The axial ball joint is not designed to a great extent for receiving radial forces acting perpendicular to the axial direction.

The housing is advantageously closed at an axial end by an axial support formed as a turned part or as a rotationally symmetrical extruded part of variable thickness in axial direction. The axial end of the housing is opposite the axial end at which the ball stud extends out of the housing. The axial end at which the ball stud extends out of the housing is also referred to as the stud-side end, and the opening from which the ball stud extends out of the housing is referred to as the stud-side opening. The axial support is formed in a stable manner so that the forces acting on the axial ball joint chiefly in axial direction during operation can be reliably received. In the case of radial ball joints, caps of shaped sheet metal material are often found in this location. However, these caps do not withstand the forces acting in axial direction in axial ball joints.

Depending on the piece number, the axial support can be constructed as a turned part, particularly as a CNC turned part, or as a rotationally symmetrical extruded part. The axial support advantageously partially has an outer circumferential surface that corresponds to a cylindrical lateral surface. In particular, this cylindrical lateral surface contacts a correspondingly shaped inner circumferential surface of the housing so as to form an interference fit. The plastic bearing shell is supported in axial direction against the axial support inside the axial ball joint. The reason for the variable thickness of the axial support in axial direction is that an area of mutual contact between the axial support and the plastic bearing shell does not extend perpendicular to axial direction, whereas an at least substantially planar and circular outer surface of the axial support facing the exterior of the housing extends perpendicular to axial direction.

It is provided in a further development that the axial support and the housing have a mutual contact surface formed in the manner of a frustoconical lateral surface. "Mutual contact surface" in this context means that the axial support and the housing have, respectively, a contact surface that complements the other in shape, contacts the other in the assembled state of the axial ball joint, and forms the mutual contact surface. The mutual contact surface is located at an axial end of the housing arranged axially opposite the axial end of the housing at which the ball stud extends out of the housing. The frustoconical lateral surface is oriented such that its axis of rotation extends in axial direction and the end of the frustoconical lateral surface having the smaller diameter faces the exterior of the housing. In an axial section, the frustoconical lateral surface includes an angle of substantially 45 degrees relative to the axial direction. By forming the mutual contact surface as a frustoconical lateral surface, a positive engagement is provided which prevents the axial support from being pushed out of the housing axially.

In the assembled state, a circumferential compressing edge of the housing abuts with the housing-side contact surface against the contact surface of the axial support. In particular, the contact surface of the compressing edge is formed circumferentially as a cylindrical lateral surface before the axial support is inserted into the housing. The contact of the compressing edge with the axial support by the mutual contact surface takes place in particular through a simultaneous compression of the compressing edge in its entirety by a compression bell moving in axial direction toward the housing. The contact of the compressing edge with the axial support is also referred to as closing of the housing. The circumferential compressing edge of the housing is configured to be more stable than hemmed edges which are known in radial ball joint housings and which are frequently folded by approximately 90 degrees by roller hemming.

Further, the housing preferably has on an inner side a stop surface for the axial support formed as an annular surface, and the stop surface extends perpendicular to axial direction. The stop surface provides an axial stop that allows the axial support to be positioned in axial direction in a reproducible manner. In this way, the plastic bearing shell can be preloaded with accurate repeatability. This ensures that the force required for swiveling the ball stud out of a neutral position, also known as breakout force, always moves within a predetermined tolerance range. "Breakout force" in this context means the force required to move the ball stud of the axial ball joint from a static neutral state to a dynamic state. The housing is formed in particular as a forged housing, although casting is also possible.

A spring element, in particular a circumferential elastomeric ring, acting in axial direction is preferably arranged between the axial support and the plastic bearing shell. This arrangement has particularly low wear because during rotational movements and/or swiveling movements of the ball stud there is no relative movement between the spring element and the axial support component and plastic bearing shell component, which are arranged adjoining it. In particular, the spring element is formed as a circumferential elastomeric ring inserted into an annular groove of the axial support and is accordingly protected against unwanted displacement. If the elastomeric ring were to contact the joint ball directly, abrasion through increased wear of the elastomeric ring would likely ensue. Since the plastic bearing shell is compliant to a certain extent because of its material characteristics, the spring force of the spring element is transmitted to the joint ball via the plastic bearing shell. In doing so, apart from a preloading of the plastic bearing shell, the spring force also adjusts for wear in case the plastic bearing shell should become worn after a prolonged period of operation. In this way, a snug bearing support of the joint ball is ensured even after extended service life. The elastomeric ring also contributes to prevent the plastic bearing shell from rotating along with the ball stud.

It is further preferable that the joint ball directly abuts the housing in an abutment area of the housing. In this way, the joint ball is supported in the abutment area directly at the housing, which results in a high load bearing capacity of the ball stud in the corresponding direction. The abutment area of the housing is formed in particular as a spherical zone with a rotational axis running in axial direction. In axial direction, the abutment area is arranged in relation to the joint ball substantially opposite the area in which the plastic bearing shell contacts the joint ball. As a result of this arrangement, a very high pull-out force of the ball stud with respect to the axial ball joint can be realized in conjunction with a relatively high inherent rigidity of the housing. The abutment area of the housing does not extend beyond the equator of the joint ball in axial direction because the joint ball of the ball stud could not be fitted in this case.

The abutment area is advantageously surface-hardened, particularly induction-hardened. As a result of the surface hardening, also known as skin hardening, wear can be minimized in the contacting area between the joint ball and the abutment area of the housing.

In a preferred further development, a closing force absorber is formed in the manner of a column-shaped recess in an interior space of the housing. The closing force absorber simultaneously forms an opening of the housing. The force transmitted into the housing particularly in axial direction for closing the housing, also referred to as closing force, is supported by the closing force absorber in a defined manner in an area of the housing adapted for this purpose. The closing force absorber is provided to be received by a compressing device in the course of producing the axial ball joint. Beyond this, the column-shaped recess reduces the mass of the housing. In particular, the closing force absorber forms the opening of the housing from which the ball stud extends out of the housing. "Column-shaped recess" in this context means a recess formed in the interior of the housing, for example, by a column-shaped tool die in the course of a cold solid forming of the housing. The column-shaped tool die has, at least along the depth by which it penetrates into the housing, a cross-sectional surface area which, in any cross sections parallel to a planar end face of the tool die facing the housing, corresponds to the respective end face.

The closing force absorber is advisably formed to be rotationally symmetrical and has a rotational axis that coincides with a central axis of the undeflected ball stud. Owing to its rotationally symmetrical arrangement, the closing force absorber can easily be positioned in the compressing device. In particular, the closing force absorber has a circumferential bevel at an edge facing the exterior of the housing so as to further facilitate insertion into the compressing device. Since the rotational axis of the closing force absorber coincides with the central axis of the undeflected ball stud, symmetrical conditions prevail when closing the housing so that a uniform distribution of the relatively high closing force, for example, several hundreds of kilonewtons, is ensured in the housing.

It is further preferable that the closing force absorber has a circumferential axial abutment surface that extends perpendicular to axial direction and which is exposed in axial direction. The circumferential axial abutment surface receives the closing force and directs it into the compressing device, in particular into a bottom part of the compressing device. Owing to the fact that the rotational axis of the closing force absorber coincides with the central axis of the ball stud and the axial abutment surface is oriented perpendicular to axial direction, the closing force initiates a purely compressive load free from the influences of transverse force. In particular, the axial abutment surface is formed as an annular surface such that the ball stud can be guided through the axial abutment surface and proceed to extend out of the housing. The property of the axial abutment surface being exposed in axial direction means that the closing force absorber has no undercuts proceeding from the axial abutment surface in axial direction toward the exterior of the housing, which allows an unimpeded access of the compressing device to the axial abutment surface. In this way, the compressing device, in particular a receptacle of the compressing device, can fully contact the axial abutment surface so that the surface pressure in the axial abutment surface is kept relatively low while the housing is being closed.

The axial abutment surface preferably lies partially outside of the joint ball in a projection in axial direction. The greatest diameter of the axial abutment surface is accordingly greater than the diameter of the joint ball. This allows an angular deflection of the ball stud that is relatively high for axial ball joints, and the angular deflection is adapted to a maximum angular deflection typical of radial ball joints. Accordingly, the axial ball joint can substitute for a radial ball joint with respect to the maximum possible angular deflection of the ball joint, so that new possibilities of using axial ball joints are created. The greatest diameter of the axial abutment surface is advantageously greater than the greatest diameter of the axial support, which is identical to the greatest diameter of the stop surface. In particular, there is no inner diameter of the housing that is greater than the greatest diameter of the axial support likewise in axial direction between the stop surface and the axial abutment surface. In this way, the closing force is transmitted in axial direction directly via a solid wall portion wall of the housing so that impermissible deformations of the housing are prevented when closing the housing.

It is further preferable that the closing force absorber has a circumferential radial centering surface formed as a cylindrical lateral surface having a rotational axis extending in axial direction. As a result of the radial centering surface, which presents a guide surface for inserting the housing into the compressing device, the housing can be accurately positioned in the compressing device and securely held in this position during the closing process. In particular, a circumferential bellows groove is incorporated in an outer wall of the housing to receive an end of a seal bellows, and the bellows groove is arranged in axial direction at the same height as the radial centering surface and, accordingly, at an axial end of the housing. This type of end-side arrangement of the bellows groove has the advantage that the seal bellows can be configured to be relatively short in axial direction. Since the bellows groove has a relatively large diameter by design, a seal bellows likewise having a relatively large diameter can be used so as to allow in turn relatively large angular deflections of the ball stud.

The ball stud is advantageously formed with an external thread having a thread length which is greater in axial direction than the thread length of the fastening thread of the connection pin. The reason for the larger thread length facing the ball stud is that the external thread of the ball stud, which is arranged in particular at the end of the ball stud opposite the joint ball, is an adjusting thread for adjusting the length of a two-point link. The thread length is composed on the one hand of a minimum screw-in depth to which the external thread of the ball joint must be screwed at least into a connection component part of the two-point link in order to be able to reliably transmit occurring forces. This minimum screw-in depth is on the order of magnitude of one and one half times the outer diameter of the external thread. Aside from the minimum screw-in depth, the thread length is composed on the other hand of the adjusting range of the two-point link. The sum of these two partial thread lengths gives the thread length of the external thread of the ball stud which is formed in axial direction preferably over more than one third, and particularly preferably over one half, of the longitudinal extension of the ball stud.

It is further advantageous when the ball stud has at its outer circumference a driving geometry formed in particular by at least two wrench faces, which are spaced apart parallel to one another. The driving geometry affords a possibility for applying an adjusting tool, for example, an open-end wrench, to perform a length adjustment of the two-point link.

Alternatively, the ball stud can also have a higher, even number of wrench faces which are uniformly distributed on the circumference of the ball stud. The wrench faces are arranged in axial direction between the joint ball and the external thread of the ball stud.

The invention is further directed to a length-adjustable two-point link, in particular for a utility vehicle. The two-point link has two angle joints connected to one another via a connection element, particularly a connection pipe. One angle joint is formed as an axial ball joint as described previously and is connected to the connection element so as to be adjustable in length, and the other angle joint is formed as a radial ball joint and is rigidly connected to the connection element. The connection element can be straight or curved along its longitudinal extension and has at its end facing the ball stud an internal thread corresponding to the external thread of the ball stud. When the ball stud is screwed directly into the internal thread of the connection element, the length adjustment of the two-point link is carried out by rotating the ball stud around its central axis. A threaded sleeve arranged between the external thread of the ball stud and the end-side internal thread of the connection element and is known from two-point links having two radial joints may be omitted because the ball stud of the axial ball joint is rotatably mounted in the housing. Besides economizing on this component part, the connection element can also be formed additionally with a smaller diameter so as to be lighter because the connection element need not accommodate a threaded sleeve. An open-end wrench, for example, is applied to the parallelly spaced-apart wrench faces for adjusting the length of the two-point link.

When the desired length adjustment position has been reached, it can be fixed by a clamp engaging around the end of the connection element facing the ball stud. The end of the connection element is slit longitudinally so that the clamping force acting perpendicular to axial direction, i.e., radially, can be transferred to the ball stud. Alternatively, the required length adjustment position can also be fixed via a clamping nut screwed onto the external thread of the ball stud and clamps the ball stud against the connection element, in particular against the connection pipe. "Rigid connection" as it relates to the present invention means a connection between two parts that can be severed in principle, for example, by destroying a positive engagement or material bond, but which are not movable relative to one another when used as prescribed. The rigid connection is formed in particular as an impact connection and particularly preferably as a heat impact connection engaging positively and frictionally at the same time. To produce the heat impact connection, a shank of the radial ball joint is provided with grooves extending partially around the circumference and which is formed integral with a housing of the radial ball joint is inserted into an end orifice of the connection element. This orifice is arranged at an end of the connection pipe opposite that end of the connection pipe receiving the ball stud. The end, which is heated beforehand, is compressed in a die after insertion of the shank, and a wall of the heated end contacts the partially circumferentially extending grooves. When the previously heated end has cooled, there is a rigid connection between the radial ball joint and the connection element.

The two-point link is preferably formed as a steering rod, track bar, stabilizer connecting rod, control linkage, or Panhard rod.

BRIEF DESCRIPTION OF THE DRAWINGS

The invention will be described more fully in the following with reference to drawings depicting only one embodiment example Like reference numerals denote like component parts or elements. The drawings show.

DETAILED DESCRIPTION OF THE PRESENTLY PREFERRED EMBODIMENTS

Figure 1:
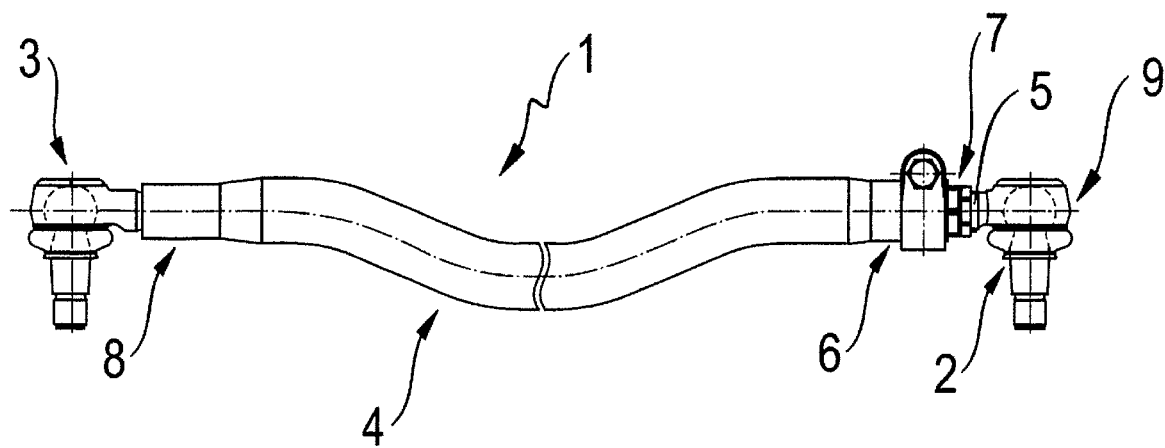
FIG. 1 is a two-dimensional view of a prior art steering rod of a utility vehicle.

FIG. 1 shows a two-point link formed as a steering rod 1 having two angle joints which are arranged at respective ends and are formed as radial ball joints 2, 3. A first radial ball joint 2 is connected to a connection element formed as connection pipe 4 such that it can be adjusted with respect to length. The first radial ball joint 2 has a shank 5 which is formed integral with a housing 9 and which is provided with an external thread. The external thread is arranged at a radial distance from an internal thread of a first end 6 of the connection pipe 4, which internal thread partially overlaps the external thread. The distance between the external thread and the internal thread is bridged by a threaded sleeve 7 that connects the shank 5 indirectly to the first end 6 of connection pipe 4. The threaded sleeve 7 must be rotated to carry out a length adjustment of the steering rod 1 in an installed state, for example, in a utility vehicle. A second radial ball joint 3 is rigidly connected to a second end 8 of the connection pipe 4.

Figure 2:
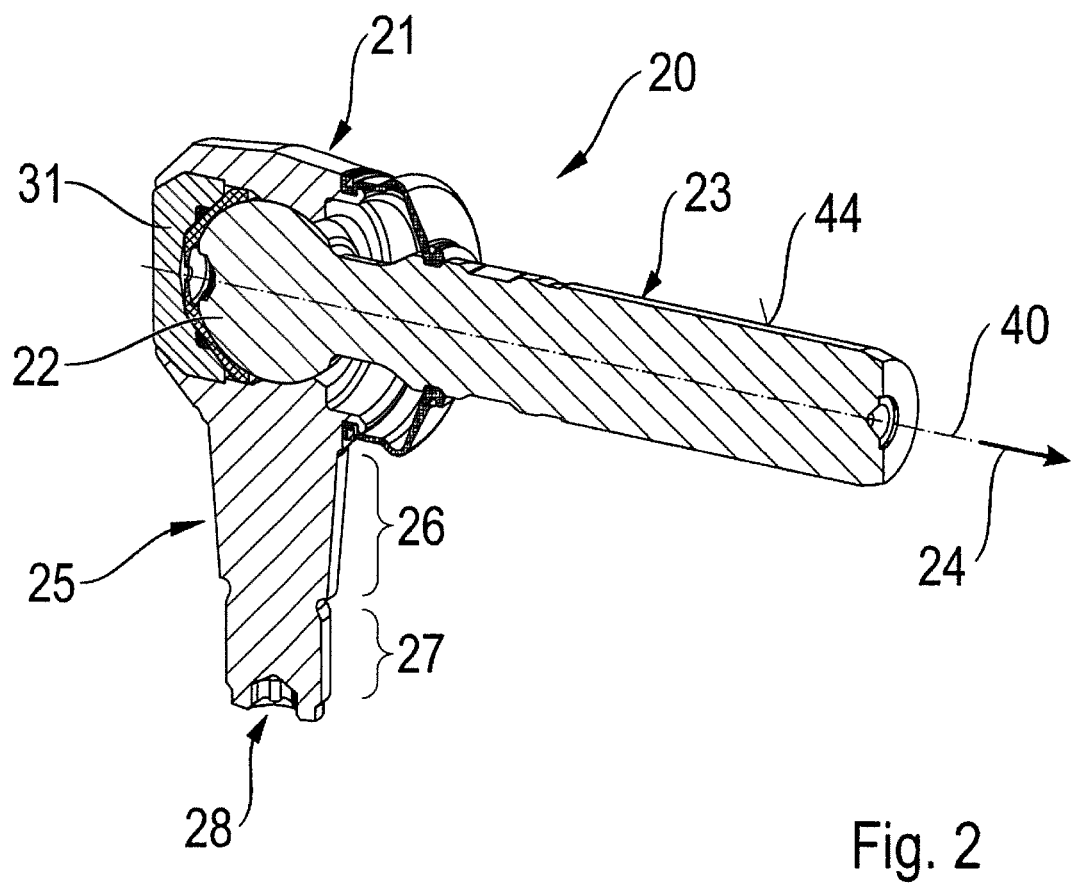
FIG. 2 is a perspective sectional view of an axial ball joint according to the invention.

FIG. 2 shows an axial ball joint 20 for a length-adjustable two-point link. The axial ball joint 20 has a housing 21 and a ball stud 23 supported by a joint ball 22 so as to be rotatably movably and swivelably movably in the housing 21. The ball stud 23, which is shown in the undeflected state, extends out of the housing 21 in an axial direction 24. The housing 21 has a connection pin 25 connected integral with the housing 21 and which extends perpendicular to axial direction 24. The connection pin 25 has a conical portion 26 for connecting the connection pin 25 to a wheel carrier 55. The connection pin 25 further has a fastening thread 27 at its free end and a driving geometry 28 at its front side, which driving geometry 28 is formed as an inner contour and is constructed as internal hexagon geometry 28.

Figure 3:
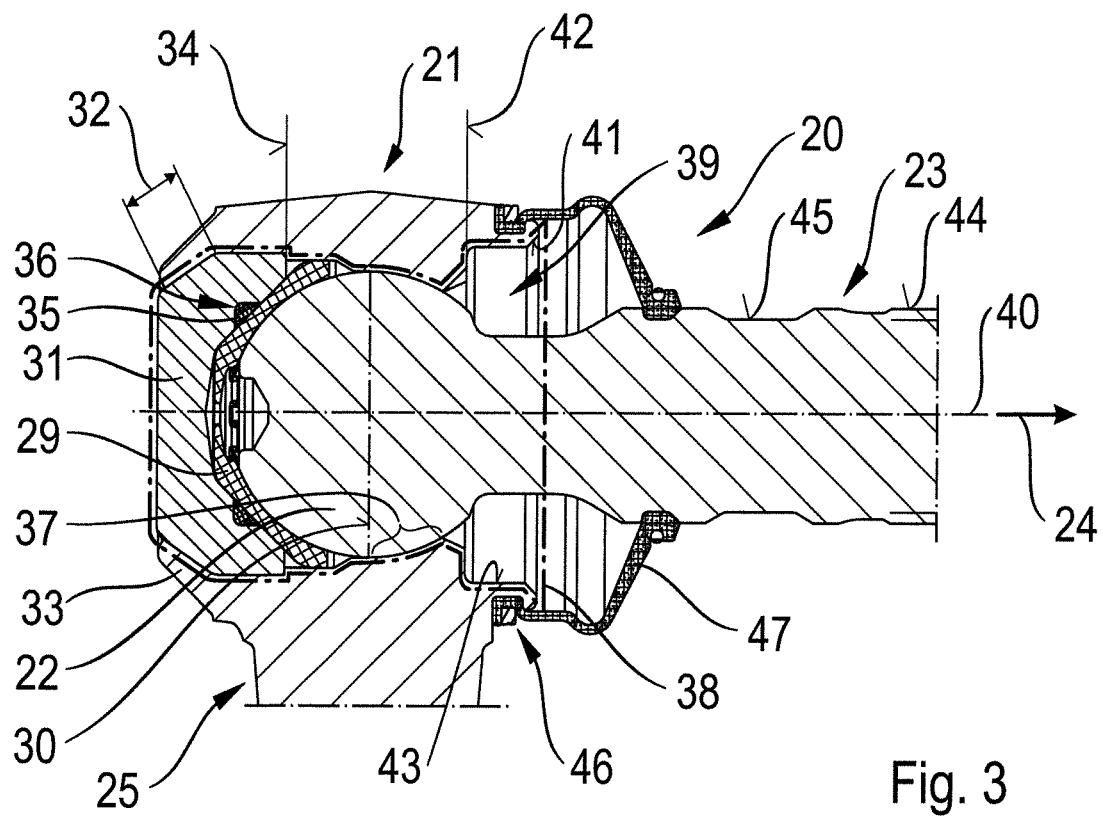
FIG. 3 is a sectional view of a portion of the axial ball joint from FIG. 2.

As can be seen from FIG. 3, a plastic bearing shell 29 is arranged snugly encircling less than half of the joint ball 22 in housing 21. The plastic bearing shell 29 is formed so as to be rotationally symmetrical with a rotational axis extending in axial direction 24 and does not extend beyond the so-called equator 30 of the joint ball 22. The plastic bearing shell 29 is formed solid in the area of a mutual contact zone with the joint ball 22. The housing 21 is closed at one axial end by an axial support 31, which is formed as a turned part having a thickness which varies in axial direction 24. The axial end is located opposite the axial end at which the ball stud 23 extends out of the housing 21. The axial support 31 and the housing 21 have a mutual contact surface 32 formed in the manner of a frustoconical lateral surface. The contact surface 32 is located at an axial end of the housing 21 arranged opposite the axial end of the housing 21 at which the ball stud 23 extends out of the housing 21. The frustoconical lateral surface is oriented such that its axis of rotation extends in axial direction 24 and the end of the frustoconical lateral surface having the smaller diameter faces the housing exterior. In the axial section shown in FIG. 3, the frustoconical lateral surface includes an angle of approximately 45 degrees relative to axial direction 24.

A contact surface associated with the housing 21 and a shape-corresponding contact surface of the axial support 31 contact one another in the mutual contact surface 32. In the assembled state shown in FIG. 3, a circumferential compressing edge 33 of housing 21 contacts the axial support 31 in the area of the mutual contact surface 32. The contact surface of the circumferential compressing edge 33 is formed circumferentially in the manner of a cylindrical lateral surface before the axial support 31 is pressed into the housing 21. The contact of the circumferential compressing edge 33 at the axial support 31 takes place accompanied by the formation of the mutual contact surface 21 through a completely simultaneous compression of the compressing edge 33 by a compression bell moving in axial direction 24 onto the housing 21. The housing 21 has on the inner side a stop surface 34 for the axial support 31 formed as an annular surface, and the stop surface 34 extends perpendicular to axial direction 24. A spring element which acts in axial direction 24 and is formed as a circumferential elastomeric ring 35 is arranged between the axial support 31 and the plastic bearing shell 29. The elastomeric ring 35 is inserted into an annular groove 36 of the axial support 31 and is accordingly protected against unwanted displacement.

The joint ball 22 directly contacts the housing 21 in an abutment area 37 of the housing 21. Accordingly, the joint ball 22 is supported directly at the housing 21 in the abutment area 37, which leads to a high load bearing capacity of the ball stud 23 in the direction in which the ball stud 23 extends out of the housing 21. The abutment area 37 of housing 21 is formed as a spherical zone with a rotational axis running in axial direction 24. In axial direction 24, the abutment area 37 is arranged, referring to the joint ball 21, opposite the area in which the plastic bearing shell 29 contacts the joint ball 22. The abutment area 37 of housing 21 does not extend beyond the equator 30 of the joint ball 22 in axial direction 24 because the joint ball 22 of the ball stud 23 could not be fitted in this case. A surface layer of the abutment area 37 is surface-hardened, particularly induction-hardened.

A closing force absorber 39 is formed in the manner of a column-shaped recess in an interior space 38 of the housing. The closing force absorber 39 simultaneously forms an opening of the housing 21. The column-shaped recess is formed cylindrically. The housing interior 38 is enclosed by a dash-dot line in FIG. 3. For the sake of clarity, the dash-dot line is not congruent with the contour line bounding the housing interior 38. The closing force absorber 39 is formed to be rotationally symmetrical and has a rotational axis that coincides with a central axis 40 of the undeflected ball stud 23. The closing force absorber 39 has a circumferential bevel 41 at an edge facing the exterior of the housing so as to facilitate insertion into a compressing device. The closing force absorber 39 forms the opening of the housing 21 from which the ball stud 23 extends out of the housing 21. Aside from this, housing 21 has a second opening which is closed by the axial support 31.

Alternatively, the closing force absorber can be formed as a blind hole arranged opposite the stud-side opening in axial direction and is accessible only from outside of the housing. "Blind hole" in this context refers to a recess like a trough-shaped depression having a defined depth. In this construction, the joint ball of the ball stud is inserted into the housing in the course of fitting the axial ball joint through the stud-side opening which now offers the only access to the housing interior. The stud-side opening is subsequently reduced in cross section, preferably by forming, so as to prevent the joint ball from being pulled out of the housing subsequently.

The closing force absorber 39 has a circumferential axial abutment surface 42 that extends perpendicular to axial direction 24 and is exposed in axial direction 24. The axial abutment surface 42 is formed as an annular surface. The axial abutment surface 42 lies partially outside of the joint ball 22 in a projection in axial direction 24. The greatest diameter of the axial abutment surface 42 is greater than the greatest diameter of the axial support 31, which is identical to the greatest diameter of the stop surface 34. At the same time, there is no inner diameter of the housing 21 that is greater than the greatest diameter of the axial support 31 in axial direction 24 between the stop surface 34 and the axial abutment surface 42. Further, the closing force absorber 39 has a circumferential radial centering surface 43 which adjoins the axial stop surface 42 and is formed as a cylindrical lateral surface extending in axial direction 24.

A circumferential bellows groove 46 for receiving a likewise circumferential connection area of a seal bellows 47 is incorporated at an axial end of housing 21 in an outer wall thereof at the same height as the radial centering surface 43 in axial direction 24. Because the bellows groove 46 is arranged at the end of the housing, the seal bellows 47 can be formed so as to be relatively compact in axial direction 24. The ball stud 23 is fitted with an external thread 44 having a thread length that is greater in axial direction 24 than the thread length of the fastening thread 27 of the connection pin 25. Further, the ball stud 23 has at its outer circumference a driving geometry formed of two wrench faces 45 which are spaced apart parallel to one another.

Figure 4:
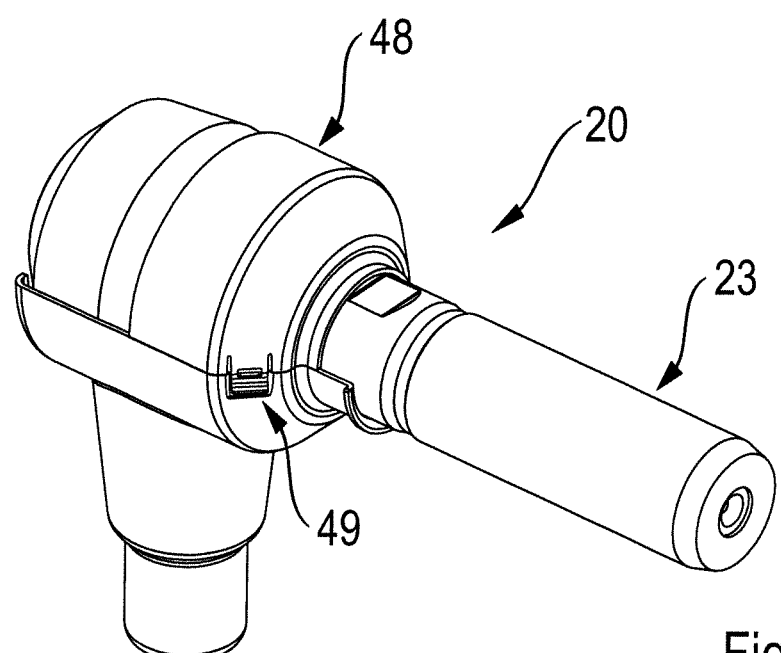
FIG. 4 is a perspective view of the axial ball joint from FIG. 2 supplemented by a protective cap.
Figure 5:
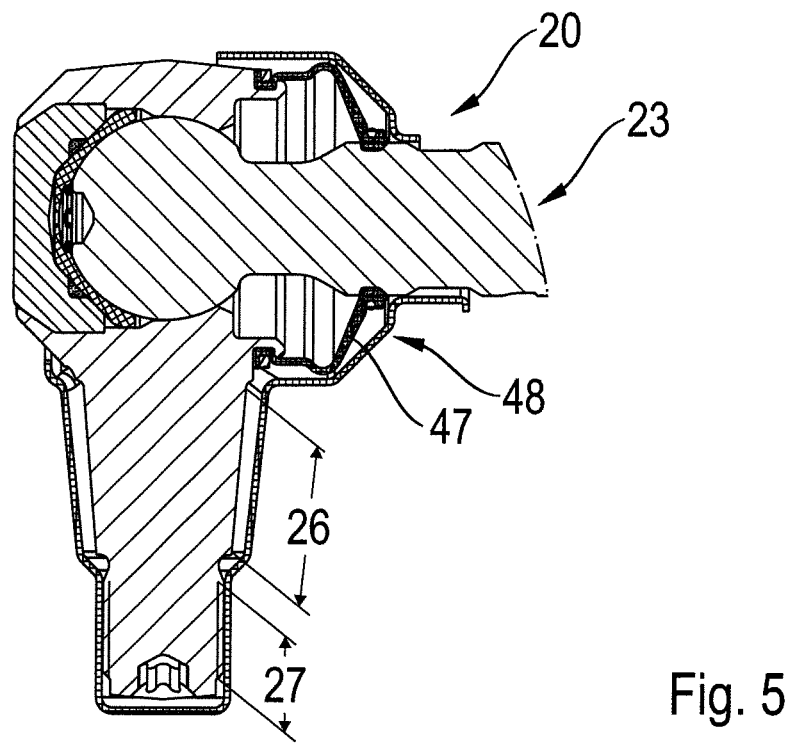
FIG. 5 is a sectional view of a portion of the axial ball joint from FIG. 4.

FIG. 4 shows the axial ball joint 20 with ball stud 23, wherein, inter alia, the connection pin 25 and the seal bellows 47 are covered by a protective cap 48. The protective cap 48 can be closed by a snap-on closure 49. Within the scope of the invention, a snap-on closure 49 means a closure in which a part of the closure moving out of an initial position automatically springs back at least partially in direction of the initial position and accordingly brings about the closing. As can be seen from FIG. 5, the protective cap 48 protects the conical portion 26 and the fastening thread 27 of the connection pin 25 and the seal bellows 47 from damage caused by mechanical action and environmental influences during transport. The protective cap 48 engages around the ball stud 23 in the undeflected position thereof and also around the connection pin 25 so that the ball stud 23 is fixed relative to the connection pin 25. This ensures a transporting of the axial ball joint 20 with undeflected ball stud 23 to the installation site, for example, a chassis of a utility vehicle.

Figure 6:
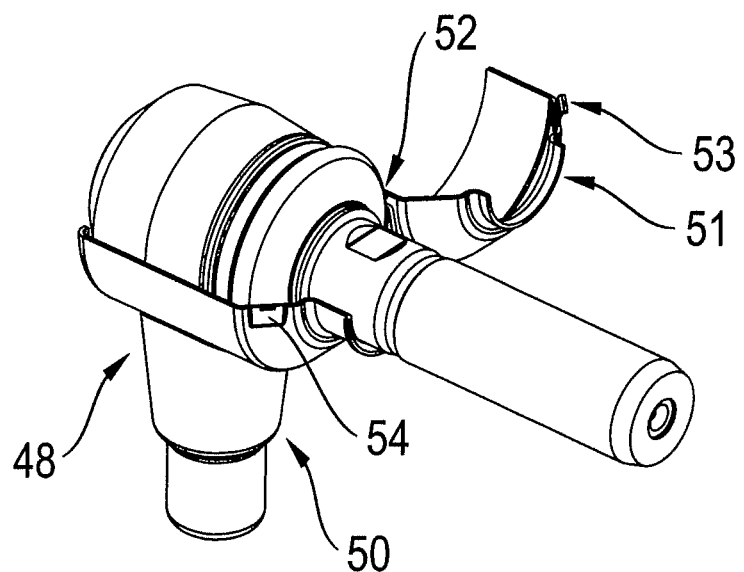
FIG. 6 is a perspective view of the axial ball joint from FIG. 4 with folded-down protective cap.

FIG. 6 shows that the protective cap 48 is formed in one part, meaning in one piece, and a bottom part 50 and a top part 51 of the protective cap 48 are connected to one another in an articulated manner via a living hinge 52. In the closed state of the protective cap 48, a clip 53 which is formed integral with the top part 51 snaps into a snap-in receptacle 54 formed integral with the bottom part 50. When closing the protective cap 48, the clip 53 initially moves out of its original position while passing over the snap-in receptacle 54 and springs back automatically into its original position when the closed position is reached. The clip 53 and the snap-in receptacle 54 together form the snap-on closure 49.

Figure 7:
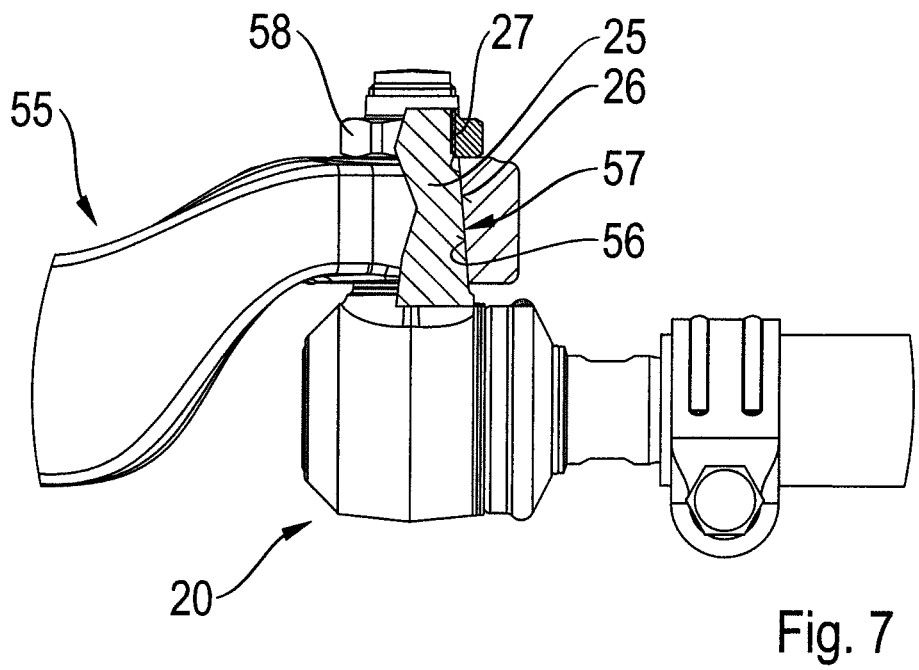
FIG. 7 is a partial sectional view of the axial ball joint from FIG. 2 in installed state.

FIG. 7 shows a connection component part formed as wheel carrier 55 and connected to the connection pin 25 of the axial ball joint 20. For this purpose, the wheel carrier 55 has a cone receptacle 56 fashioned so as to correspond in shape to the conical portion 26 of the connection pin 25. The cone receptacle 56 and the conical portion 26 form a conical fit 57 which is self-centering and ensures a snug fit of the connection pin 25 in the cone receptacle 56 of the wheel carrier 55. The conical portion 26 of the connection pin 25 is clamped relative to the cone receptacle 56 of the wheel carrier 55 via a nut 58 which is received by the fastening thread 27 of the connection pin 25 to ensure a durable fit and to prevent a loosening of the cone connection.

Figure 8:
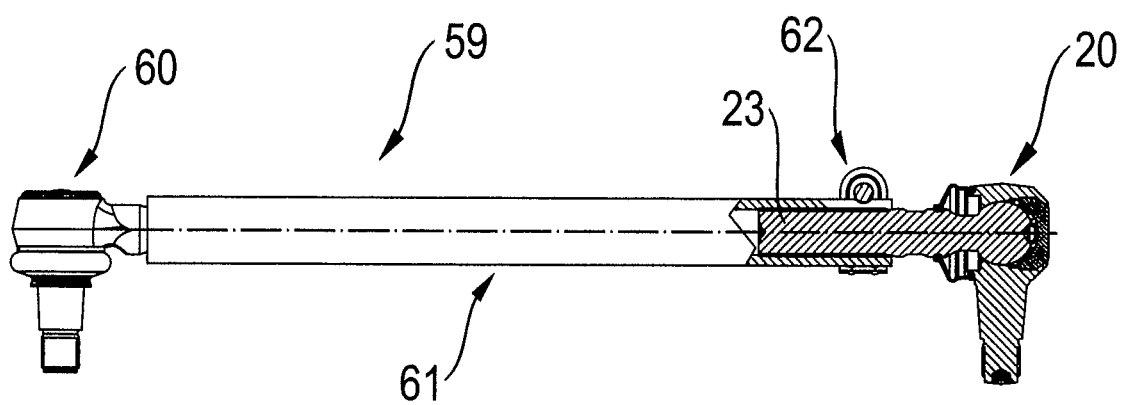
FIG. 8 is an assembled view in partial section showing a two-point link according to the invention.

FIG. 8 shows a length-adjustable two-point link formed as a length-adjustable track bar 59 for a utility vehicle. The length-adjustable track bar 59 has two angle joints 20, 60 which are connected to one another via a connection element formed as a connection pipe 61, and axial ball joint 20 forms one of the two angle ball joints. Axial ball joint 20 is connected to the connection pipe 61 to be adjustable in length. The connection pipe 61 is configured to be straight along its longitudinal extension. The other angle joint is formed as a radial ball joint 60 and is rigidly connected to the connection element 61 through a heat impact connection which is both positively engaging and frictionally engaging. The connection pipe 61 has at its end facing the ball stud 23 an internal thread which is formed to correspond to the external thread 44 of ball stud 23.

The track bar 59 is adjusted in length by screwing the ball stud 23 directly into the internal thread of connection pipe 61. To this end, an open-end wrench is applied to the wrench faces 45 which are spaced apart parallel to one another, and the ball stud 23 is rotated around its central axis 40. When the desired length adjustment position is reached, it can be fixed by a clamp 62 which engages around the end of the connection pipe 61 facing the ball stud 23. The connection pipe 61 has at its end an elongated slot piercing a wall of the connection pipe 61 so that the clamping force acting in radial direction can be transmitted to the ball stud 23.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An axial ball joint for a length-adjustable two-point link, comprising:
    a housing;
    a connection pin that is integrally connected to the housing and extends at least substantially perpendicular to an axial direction of the housing,
    an axial support which is formed as a turned part or as a rotationally symmetrical extruded part having a thickness varying in axial direction and configured to close the housing at an axial end;
    a joint ball; and
    a ball stud rotatably movably supported in the housing by the joint ball so as to be rotatably and swivelably movable and which extends in an axial direction out of the housing in an undeflected state, wherein the ball stud is configured to be connected in a length-adjustable manner to a connection component part via a thread connection, wherein the ball stud has at its outer circumference a driving geometry.

2. The axial ball joint according to claim 1, wherein the connection pin has a conical portion.

3. The axial ball joint according to claim 1, wherein the connection pin has a fastening thread at its free end and a driving geometry at a front side formed configured as an inner contour.

4. The axial ball joint according to claim 3, wherein the ball stud is formed with an external thread having a thread length that is greater in the axial direction than the thread length of the fastening thread of the connection pin.

5. The axial ball joint according to claim 3, wherein the inner contour, is an internal hexagonal geometry or an internal hexalobular geometry.

6. The axial ball joint according to claim 1, further comprising:
    a plastic bearing shell arranged in the housing and configured to snugly encircle less than half of the joint ball.

7. The axial ball joint according to claim 6, wherein a spring element, configured as a circumferential elastomeric ring, acts in the axial direction, and is arranged between the axial support and the plastic bearing shell.

8. The axial ball joint according to claim 1, wherein the axial support and the housing have a mutual contact surface formed as a frustoconical lateral surface.

9. The axial ball joint according to claim 1, wherein the housing has on an inner side a stop surface for the axial support formed as an annular surface, wherein the stop surface extends perpendicular to the axial direction.

10. The axial ball joint according to claim 1, wherein the joint ball directly contacts the housing in an abutment area of the housing.

11. The axial ball joint according to claim 10, wherein the abutment area is at least one of surface-hardened and induction-hardened.

12. The axial ball joint according to claim 1, wherein a closing force absorber is formed as a column-shaped recess in a housing interior, wherein the closing force absorber simultaneously forms an opening of the housing.

13. The axial ball joint according to claim 12, wherein the closing force absorber is configured to be rotationally symmetrical and has a rotational axis that coincides with a central axis of the ball stud in an undeflected state.

14. The axial ball joint according to claim 12, wherein the closing force absorber has a circumferential axial abutment surface that extends perpendicular to the axial direction and which is exposed in the axial direction.

15. The axial ball joint according to claim 14, wherein the axial abutment surface lies partially outside of the joint ball in a projection in the axial direction.

16. The axial ball joint according to claim 12, wherein the closing force absorber has a circumferential radial centering surface formed as a cylindrical lateral surface having a rotational axis extending in the axial direction.

17. The axial ball joint according to claim 1, wherein the driving geometry is formed by at least two wrench faces that are spaced apart parallel to one another.

18. A length-adjustable two-point link, comprising:
a connection element configured as a connection pipe;
two angle joints connected to one another via the connection element,
wherein one angle joint is formed as an axial ball joint comprising:
a housing;
a connection pin that is integrally connected to the housing and extends at least substantially perpendicular to an axial direction of the housing,
an axial support which is formed as a turned part or as a rotationally symmetrical extruded part having a thickness varying in axial direction and configured to close the housing at an axial end;
a joint ball; and
a ball stud rotatably movably supported in the housing by the joint ball so as to be rotatably and swivelably movable and which extends in an axial direction out of the housing in an undeflected state, wherein the ball stud is configured to be connected in a length-adjustable manner to a connection component part via a thread connection, wherein the ball stud has at its outer circumference a driving geometry,
wherein the axial ball joint is connected to the connection element so as to be adjustable in length, and the other angle joint is formed as a radial ball joint and is rigidly connected to the connection element.

19. The length-adjustable two-point link according to claim 18, wherein the two-point link is formed as one of a steering rod, a track bar, a stabilizer connecting rod, a control linkage, and a Panhard rod.

* * * * *